Feb. 20, 1968     N. D. THOMAS, SR     3,369,622

CENTER DRIVE VEHICLE MECHANISM

Filed Jan. 24, 1966     3 Sheets-Sheet 1

INVENTOR.
NYAL D. THOMAS, SR.
BY *Eugene M. Eckelman*
ATTORNEY

Feb. 20, 1968  N. D. THOMAS, SR  3,369,622

CENTER DRIVE VEHICLE MECHANISM

Filed Jan. 24, 1966  3 Sheets-Sheet 2

INVENTOR.
NYAL D. THOMAS, SR.
BY Eugene M. Eckelman
ATTORNEY

Feb. 20, 1968   N. D. THOMAS, SR   3,369,622
CENTER DRIVE VEHICLE MECHANISM
Filed Jan. 24, 1966   3 Sheets-Sheet 3
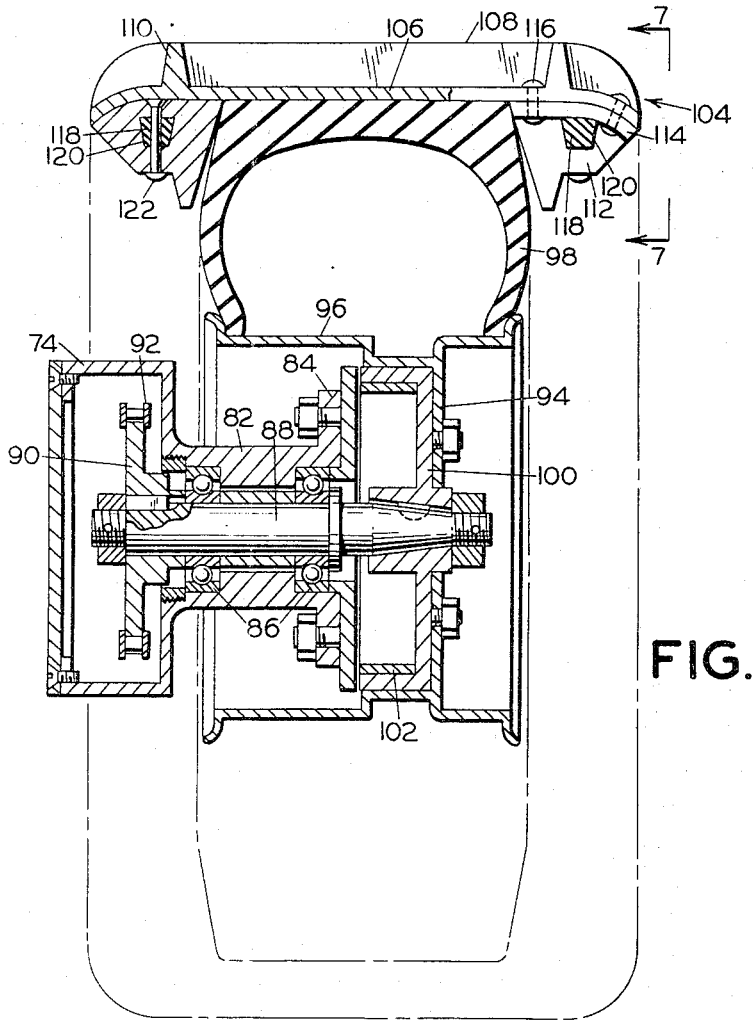
FIG. 6
FIG. 7
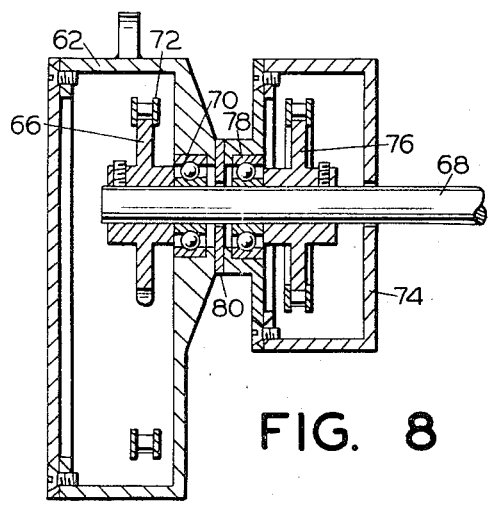
FIG. 8
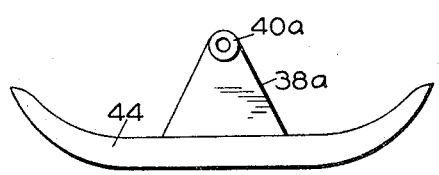
FIG. 9
INVENTOR.
NYAL D. THOMAS, SR.
BY Eugene M. Eckelman
ATTORNEY United States Patent Office 3,369,622
Patented Feb. 20, 1968

3,369,622
CENTER DRIVE VEHICLE MECHANISM
Nyal Deveraux Thomas, Sr., P.O. Box 388,
Nevada City, Calif. 95959
Filed Jan. 24, 1966, Ser. No. 522,467
7 Claims. (Cl. 180—5)

This invention relates to new and useful improvements in vehicle drive mechanisms, and more particularly is concerned with that portion of such a mechanism which is in engagement with the supporting surface for the vehicle.

A primary objective of the present invention is to provide a vehicle drive mechanism which is disposed intermediate outside vehicle supporting means and which is arranged to engage the supporting surface for driving the vehicle.

Another object of the invention is to provide a vehicle drive mechanism which is disposed intermediate outside vehicle supporting means and arranged for vertical drive adjustment whereby to be engaged continuously with the supporting surface of the vehicle regardless of the contour of such supporting surface, and furthermore to provide a novel arrangement of supporting and drive elements whereby the latter are arranged to ride on the supporting surface.

Another object is to provide a novel arrangement of center drive wheels and cleated tracks therefor.

Still another object is to provide a vehicle drive mechanism employing drive means intermediate outer supporting elements, the vehicle including a novel connection for the outside supporting means such that different structures of the outside support means can be substituted one for the other for operating the vehicle on snow, road or trails, water, or any other surface.

Briefly stated, the center drive vehicle mechanism of the present invention comprises a chassis having outer supporting means for operation on a supporting surface. The outer supporting means serve merely as the support for the vehicle on said supporting surface and have no driving power. Mounted intermediate the outer supporting means is a driven mechanism operated by the power plant of the vehicle and arranged for engaging the supporting surface in a driving function. The drive means is vertically movable and urged forcibly downwardly into engagement with the supporting surface whereby to establish a driving engagement with the latter regardless of the contour thereof. The invention will be better understood and additional objects will become apparent from the following specification and claims, considered together with the accompanying drawings, wherein the numerals of reference indicate like parts.

In the drawings:

FIGURE 6 is a sectional view, also enlarged, taken on the line 6—6 of FIGURE 4;

FIGURE 7 is a fragmentary elevational view taken on the line 7—7 of FIGURE 6;

FIGURE 8 is an enlarged, fragmentary sectional view taken on the line 8—8 of FIGURE 4; and FIGURE 9 is a side elevational view of still another form of vehicle supporting means.

Figure 1:
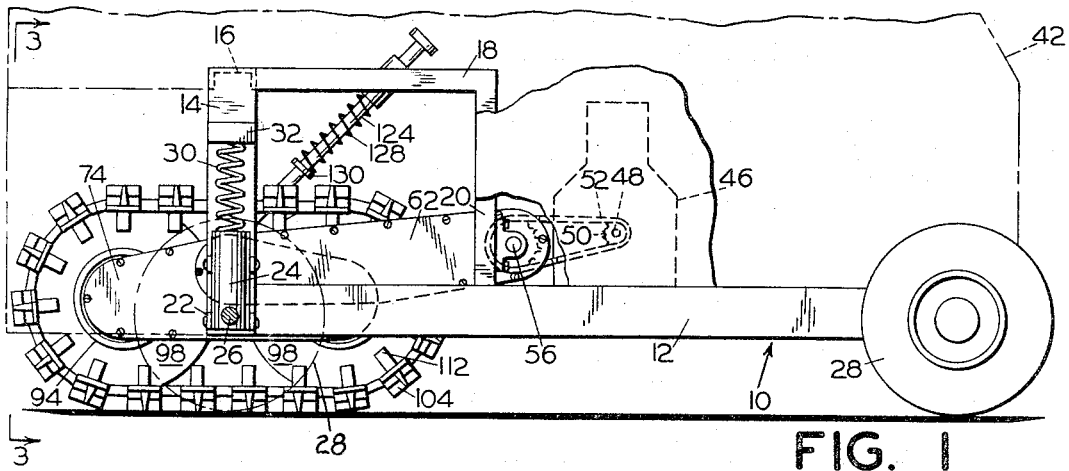
FIGURE 1 is a side elevational view of the center drive means of the present invention mounted on a vehicle chassis, a portion of said chassis being broken away for clarity.

Referring now particularly to the drawings and first to FIGURES 1 and 3–8, the numeral 10 designates generally the chassis of a vehicle forming a part of the present invention. Such chassis comprises longitudinal frame members 12 which support a pair of upstanding side frame members 14 at the rearward end thereof. Frame members 14 are interconnected across the top thereof by a cross frame member 16. Also extending forwardly from the cross frame member 16 is an auxiliary frame member 18 suitably supported by one or more forward posts 20.

Pivotally connected to each of the upstanding frame members 14 by means of pivotally connected links 22 is a wheel supporting standard 24 having an outwardly directed spindle 26 for journaled connection with a conventional wheel 28. A spring suspension between the wheel supporting standards 24 and the vehicle frame is accomplished by compression springs 30 confined between the standards 24 and integral outwardly extending horizontal lugs 32 on the frame members 14.

The forward end of the vehicle chassis is supported by steerable front wheels 28 which are of conventional construction. It is desired that such wheels have journaled engagement on spindles 26, not shown, identical to those described in connection with the rear wheels. The purpose of the spindles 26 on all the supporting points of the chassis is that the wheels 28 may be removed and replaced with other supporting means. For example, with reference to FIGURE 2, pontoons 36 may be substituted for the wheels of FIGURE 1 for operating the vehicle on water. The pontoons have upwardly directed, selectively spaced arms 38 provided with sockets 40 for the reception of the spindles 26. FIGURE 2 shows a somewhat different shape of chassis 10a and thus illustrates that various types of chassis may be used, and furthermore FIGURES 1 and 2 illustrate that various body constructions 42 and 42a respectively may be utilized.

FIGURE 9 illustrates another form of vehicle supporting means, comprising ski members 44 which similar to FIGURE 2 have upright arms 38a provided with sockets 40a for receiving the spindles 26. In a preferred construction, individual ski members 44 are provided for each spindle 26 and have free rotation on the spindle whereby to pivot to the contour of the supporting surface. The structure shown in FIGURE 1 permits the vehicle to be operated on roads or trails, the structure of FIGURE 2 permits the vehicle to be operated on water, and the structure of FIGURE 9 permits the vehicle to be operated on snow. In all the forms shown there is no driving function accomplished by the support means, such driving function being accomplished by center drive means now to be described.

Figure 2:
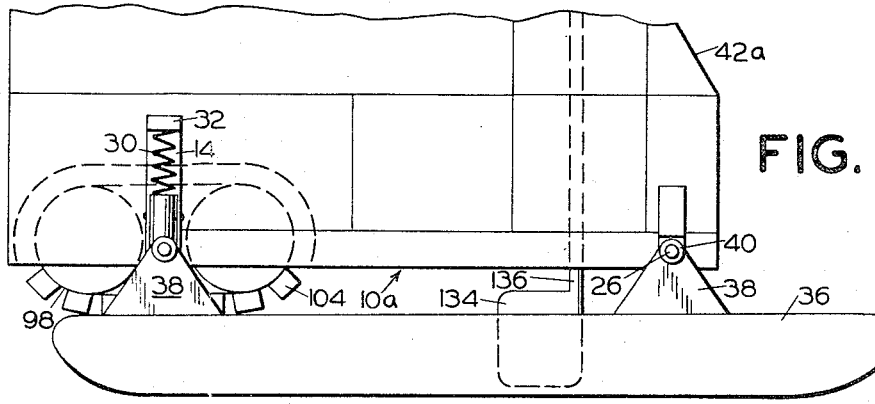
FIGURE 2 is a side elevational view also of a vehicle chassis but showing alternative means for supporting the vehicle on a supporting surface.

Such drive means comprises a power plant 46, such as a gasoline engine, FIGURE 1, suitably mounted on the chassis 10 and having an output shaft 48. Output shaft 48 has a sprocket wheel 50 keyed thereto which drives a sprocket chain 52, also seen in FIGURE 4, engaged with a sprocket wheel 54 keyed to a cross shaft 56 journaled in suitable bearings 58 attached to the frame members 12. Associated with the sprocket wheel 54 is a clutch 60 of conventional construction capable of providing either a drive connection between the sprocket 54 and shaft 56 or a free wheeling connection therebetween.

Figure 5:
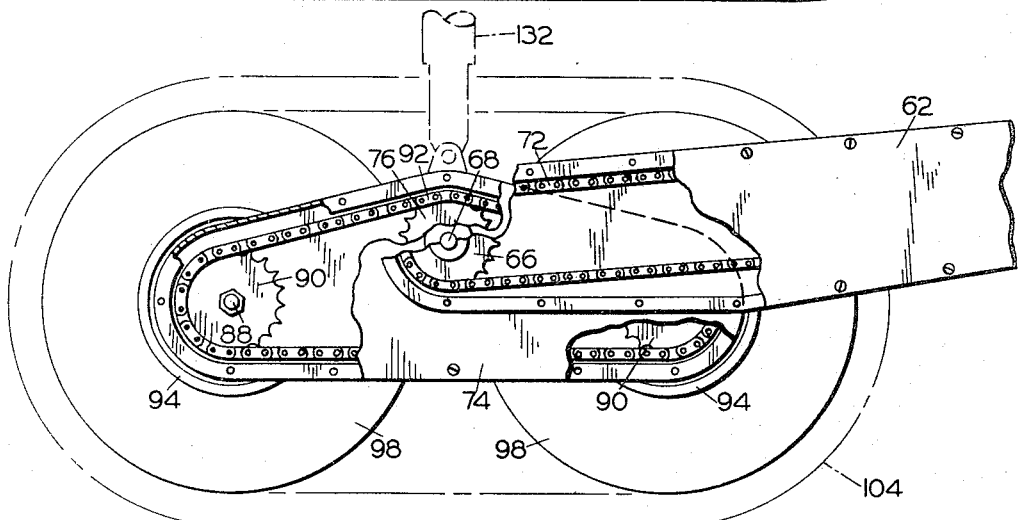
FIGURE 5 is a vertical sectional view, somewhat enlarged, taken on the line 5—5 of FIGURE 4.
Figure 4:
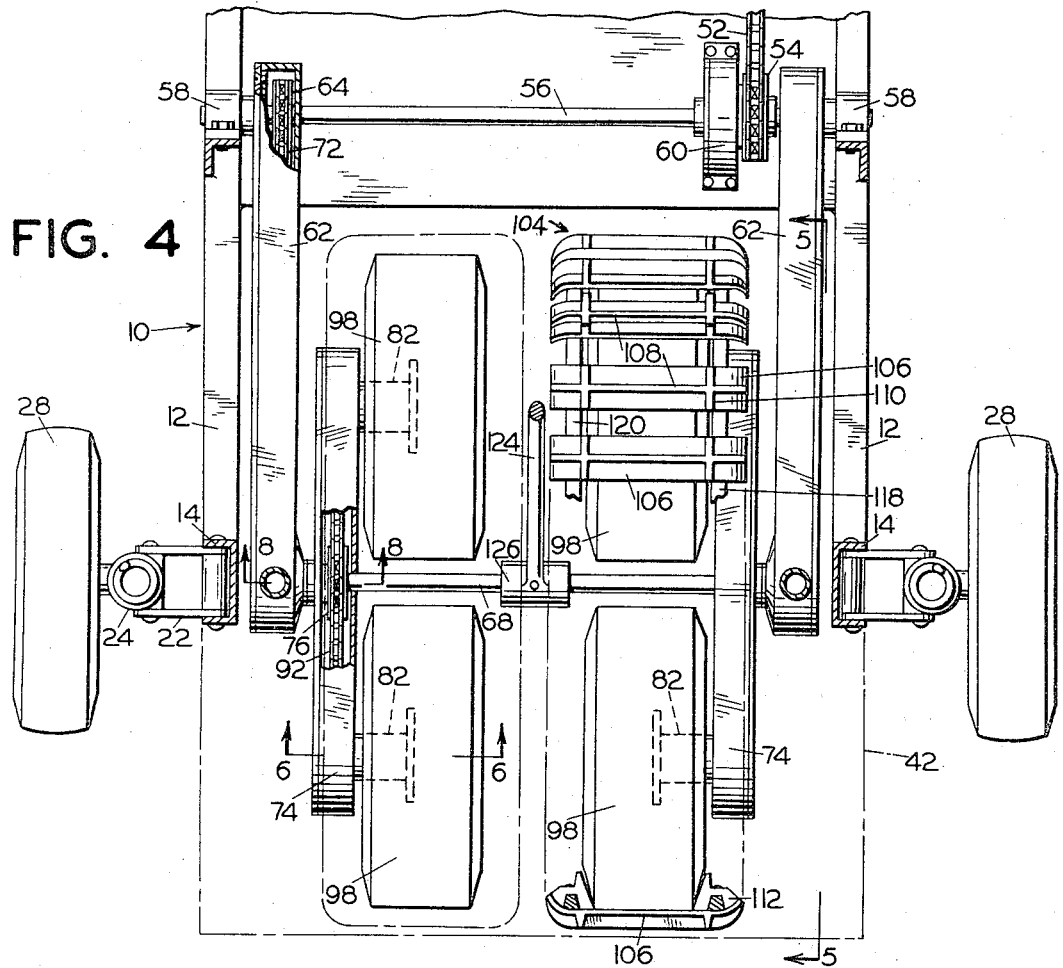
FIGURE 4 is a horizontal sectional view taken on the line 4—4 of FIGURE 3.

Journaled on the cross shaft 56 adjacent each end thereof, FIGURES 1, 4 and 5, is a hollow, rigid arm 62 enclosing a sprocket wheel 64 keyed to the shaft 56. The arms 62 extend longitudinally in a rearward direction, and with reference to FIGURE 8, sprocket wheels 66 are enclosed in the rearward portion of such arms and are secured on the opposite ends of a shaft 68 which projects laterally into the housings. The shaft 68 has journaled engagement in the arms 62 by means of bearings 70. Thus, as seen in FIGURE 4 the shaft 68 projects laterally between the two side disposed arms 62. Forward sprockets 64 have a drive connection with their respective rear sprocket wheels 66 by means of a sprocket chain 72 whereby upon operation of the cross shaft 56 shaft 68 is driven thereby.

Rotatably supported on the shaft 68 inwardly of the arms 62 are rocker arms 74 which similar to the arms 62, comprise hollow rigid housings. As best seen in FIGURE 4, the shaft 68 projects through the rocker arms at the longitudinal center of the latter. Enclosed in the arms 74, FIGURES 5 and 8, and keyed or otherwise secured on the shaft 68 are sprocket wheels 76. As best seen in FIGURE 8 the journaled engagement of shaft 68 with arms 62 is accomplished by bearings 78, and an anti-friction washer 80 is disposed between the two arms 62 and 74 to provide a non-wearing relative rotation of such arms.

With reference to FIGURES 4 and 6, a hub 82 having an end flange 84 extends inwardly and integrally from each of the arms 74. Journaled in each of the hubs 82, by means of bearings 86, is a stub shaft or spindle 88 one end of which projects into the hollow arms 74. The said projecting ends of the shafts 88 have keyed or otherwise secured thereto sprocket wheels 90, FIGURE 5, driven by sprocket chains 92 engageable with the sprocket wheels 76 on the shaft 68. As is apparent in FIGURE 5, driving movement of the sprocket chain 72 from the drive shaft 56 operates to drive the sprocket wheel 76 which in turn drives the end sprocket wheels 90.

The opposite ends of the stub shafts 88 projects through their respective hubs and form spindles for drive wheels 94 having the usual flanged construction 96 for receiving a tire 98. The wheels 94 are generally of conventional construction, having the usual brake drum 100 secured to the wheel and brake shoes 102 operatively engageable with the drum for braking the vehicle. Means for operating the brake shoes are not shown herein since such comprises conventional construction.

In the construction described the wheels 94 are all driven. Furthermore, this wheel assembly, being connected to the arms 62, is free to pivot on the shaft 56, and the arms 74 are free to rock on the shaft 68 whereby the wheel assembly can maintain itself either in a drive position parallel with the chassis of the vehicle or if necessary in an angled position conforming to the contour of the supporting surface.

The tires 98 may be of the conventional large cleated construction for effecting a positive grip with a supporting surface, or if desired cleat tracks 104, FIGURES 4, 6 and 7, may be mounted on the tires. Such a cleat track construction comprises a plurality of cross plates 106 each of which carries a cleat 108 and reinforcing webs 110. Secured to the tire engaging side of the plates 106 and at each end thereof are ears 112 which serve to hold the plates 106 on the tires. Ears 112 have side flanged portions 114 for receiving rivets 116, or other fastening means, for securing the lugs to the cross plates 106.

The cross plates are connected together by endless, flexible belts 118 received in apertures 120 in the ears 112. The cleat plates 106 are securely attached to the belts 118 by rivets 122 passing through suitable apertures in the lugs 112 and in the belts. By means of the frictional engagement of the cleat tracks 104 over the tires 98, the said tracks operate with the wheels for obtaining a drive engagement on the supporting surface.

Although it is possible that the gravitational engagement of the drive wheels with the supporting surface may be sufficient to propel the vehicle, it is preferred that the said drive wheel assembly be spring pressed in a downward direction to obtain a more positive engagement with the supporting surface. For this purpose, FIGURES 1, 3 and 4, a push rod 124 has a journaled attachment to the shaft 68 by means of an end socket member 126 on the rod, and such rod, FIGURE 1, projects upwardly and slidably through the auxiliary frame member 18. Mounted on the rod 124 is a compression spring 128 which is confined between an abutment portion 130, such as an abutment washer, on the rod and the frame member 18. Thus, the drive wheel assembly is urged downwardly into positive engagement with the supporting surface.

Figure 3:
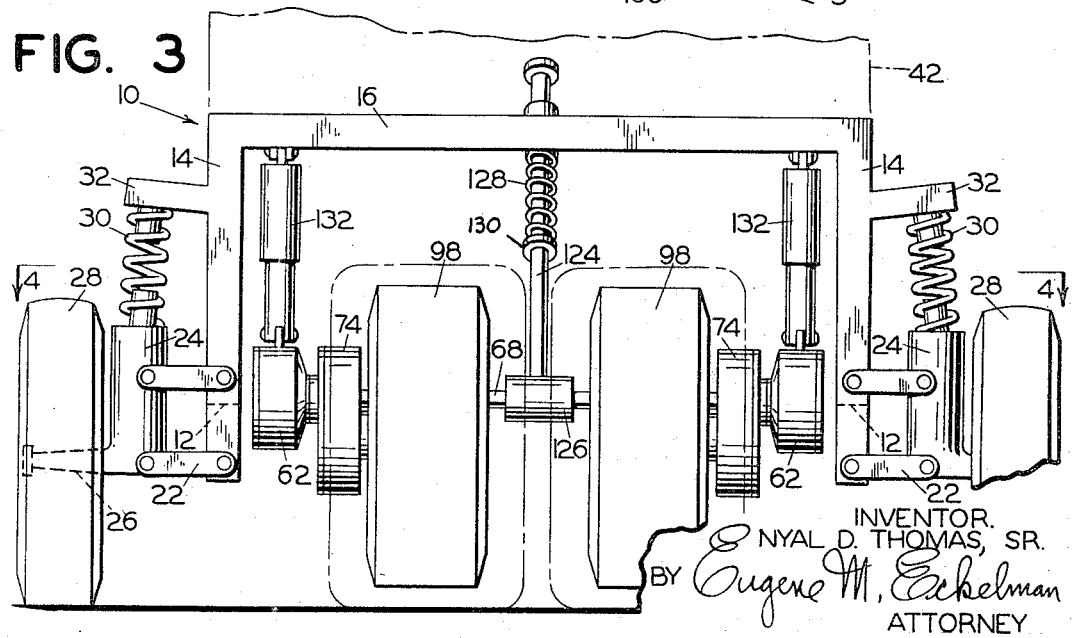
FIGURE 3 is an enlarged end elevational view taken on the line 3—3 of FIGURE 1.

In a preferred construction, conventional shock absorber mechanisms 132, FIGURE 3, are connected between the rearward portion of the arms 62 and the cross frame member 16. Such mechanisms serve to cushion and control the vertical movement of the drive wheel assembly as it engages and conforms to the contour of the supporting surface.

In accordance with the present invention there is thus provided a vehicle mechanism which, importantly, utilizes a center drive assembly engaging the supporting surface at all times and adapted to conform to the contour of the supporting surface. Furthermore, the center drive assembly is adaptable for driving the vehicle on road or trail surfaces, on snow, or on water, the outer vehicle supporting members, such as the wheels 28, the pontoons 36, or the skis 44, being substituted one for the other depending upon the surface on which the vehicle is to be propelled. With reference to FIGURE 2, a steering rudder 134 is provided at the front end of the vehicle and has a steering shaft 136 which projects upwardly into the operator's compartment. The rudder 134 is operative to maneuver the vehicle when it is run on water.

It is to be understood that the form of my invention herein shown and described is to be taken as a preferred example of the same and that various changes in the shape, size and arrangement of parts may be resorted to without departing from the spirit of my invention or the scope of the subjoined claims. For example it is to be understood that the central drive mechanism may comprise merely one forward and one rearward drive wheel 94 instead of the two pairs as illustrated. Furthermore, as stated hereinbefore the wheels 94 may carry tires which have tractor-type cleats thereon whereby the cleat tracks 104 may not be necessary. Also as illustrated in FIGURES 1 and 2 the shape and construction of the vehicle chassis and body may vary.

Having thus described my invention, I claim:

1. A vehicle mechanism comprising a chassis having forward and rearward ends and side portions; power means on said chassis, support means on said side portions for movably supporting said chassis on a surface on which said vehicle is to be propelled; drive means on said chassis disposed inwardly of the side portions and comprising a first transverse shaft, means connecting said shaft with said power means for effecting powered rotation of said shaft, a pair of arm means pivotally mounted at one of their ends on said shaft and extending longitudinally of the chassis in parallel laterally spaced relation, a second transverse shaft rotatably journaled in the other end of said pair of arm means, means establishing a drive connection between said first and second shafts, a pair of longitudinally disposed rocker arms pivotally mounted at their mid portions on said second shaft in laterally spaced relation, a drive wheel mounted on each end of said rocker arm, said pivotally mounted rocker arms permitting adjustment of said drive wheels to the contour of the supporting surface, means establishing a drive connection between said second shaft and each of said drive wheels, said rocker arms comprising a hollow, rigid member and enclose said means which establish the drive connection between said second shaft and said drive wheels and means connected to said second shaft at a point between said rocker arms arranged to resiliently bias said drive wheels forcibly downwardly into engagement with the supporting surface.

2. The vehicle mechanism of claim 1 including a pair of said wheels on each rocker arm, said rocker arms being independently pivotally mounted on said second shaft.

3. The vehicle mechanism of claim 1 including an endless cleated track mounted on said drive wheels.

4. The vehicle mechanism of claim 1 wherein said vehicle includes releasable attachment means for said support means whereby selected supported means may be interchanged one for the other.

5. The vehicle mechanism of claim 4 wherein said support means comprises wheels for operation of the vehicle on a road or the like.

6. The vehicle mechanism of claim 4 wherein said support means comprises skis for operation of the vehicle on snow.

7. The vehicle mechanism of claim 4 wherein said support means comprises pontoons for operation of the vehicle on water.

References Cited

UNITED STATES PATENTS

| | | | |
|---|---|---|---|
| 1,696,125 | 12/1928 | Rantasa | 180—5 |
| 2,051,496 | 8/1936 | Sarrazin | 180—954 X |
| 2,323,526 | 7/1943 | Eliason | 180—5 X |
| 2,330,623 | 9/1943 | Rantasa | 180—9.28 X |
| 2,878,883 | 3/1959 | France. | |
| 2,925,873 | 2/1960 | LaPorte | 180—9.28 X |
| 2,974,741 | 3/1961 | Witzmann | 180—15 |

FOREIGN PATENTS 271,287  1/1958  Switzerland.

RICHARD J. JOHNSON, *Primary Examiner.*

LEO FRIAGLIA, *Examiner.*